United States Patent Office.

ASA R. REYNOLDS, OF AUBURN, NEW YORK.

Letters Patent No. 63,097, dated March 19, 1867.

IMPROVEMENT IN WELDING STEEL TO MALLEABLE IRON AND TEMPERING THE STEEL BY ONE OPERATION.

*The Schedule referred to in these Letters Patent and making part of the same.*

TO ALL WHOM IT MAY CONCERN:

Be it known that I, ASA R. REYNOLDS, of Auburn, in the county of Cayuga, and State of New York, have invented or discovered certain new and useful Improvements in Welding Steel on to Iron and Tempering the Steel at One and the Same Operation; and I do hereby declare the following to be a full, clear, and exact description of the same.

In the manufacture of shear blades it is common to weld the steel to the malleable metal backs, often cast, and afterward temper the steel; but by this procedure very great loss is encountered from the breaking of the cast or other metal backs, or of the malleable portion of such blades, making the process expensive from such losses, besides requiring the two separate operations of welding and of tempering. My invention consists in welding the steel to the malleable iron and tempering the steel at one and the same operation, and with great saving of fracture of the malleable portion of the blade and of time in the operation.

In carrying out my invention, I propose to use the principle of the reactionary blow upon the metal, as described in my patent of the 28th August, 1866, and by the same blow to weld the two metals together; and I may use a machine for that purpose such as is described in my aforesaid patent, or any other wherein a drop-die or hammer is used in connection with the reaction of the blow, without which the tempering cannot be obtained. Shear blades or stocks may be cast of any suitable shape, form, or style, and rendered malleable by decarbonization in any of the usual well-known ways, and cleaned preparatory to the welding thereto of the steel faces to the blades. The steel is cut of the proper shape and size, and both the malleable iron and the steel having been properly heated the malleable portion is laid into a die or bed of the proper shape and form to receive it, the steel plate laid on to it, and the drop-die or hammer is let fall upon it; the blow welds the two metals together, and the blow and recoil or reaction effect the tempering. Of course the usual condensation of the steel follows this united action of the blow and of the reaction, or, as I have properly termed it, this "reactionary blow," and a temper is produced in the steel far better than that of liquid tempering. This mode of welding steel to malleable or wrought iron and tempering the steel at one and the same time or operation saves much time, as it saves at least one entire operation and may save a second heating of the blades; but much the greater saving is effected by the almost entire freedom from fracture of the malleable portion of the metal by my process; and the united savings of time and exemption from fracture very much reduce the cost of the article, and the process of tempering produces an article hitherto unknown in the market for the fineness and durability of its cutting edge. After the welding and tempering are finished, the blades may be ground, lackered, or japanned, or otherwise finished up, as may be preferred.

In ordinary welding the hammer is light and the blows rapidly repeated. I reverse this order of operation that I may temper as well as weld. I use a very heavy hammer and generally but a single blow, and that but at a very restricted height above the article to be operated upon; but the reaction that I get, and the waves or shiverings of motion that follow the blow and reaction while the steel is held firmly between the drop-die and the anvil or anvil-die, produce a temper in steel that has never been attained by any mode of tempering practised at the present day; and as to the simplicity, cheapness, uniformity of temper, and the rapidity with which the welding and tempering is done, the process discovered by me certainly surpasses that of any other plan pursued by manufacturers of such articles. I may use in connection with the blow, reaction, and griping or holding of the article between the dies, or die and anvil, a forced blast or current of air, or I may omit it, as the article operated upon may require.

Having thus fully described my invention, what I claim therein as new, and desire to secure by Letters Patent, is—

Welding steel to malleable or wrought iron and tempering the steel by one and the same process or operation, viz, by submitting the two metals in a properly heated condition to the action of a drop-die and the reaction thereof with the under or anvil die and the metal held between them, substantially as described.

ASA R. REYNOLDS.

Witnesses:
HORACE T. COOK,
JAS. HENDERSON.